(No Model.)

C. A. PENNINGTON.
NUT LOCK.

No. 314,194. Patented Mar. 17, 1885.

WITNESSES
Phil C. Dieterich
T. R. Keijworth

INVENTOR
Chas. A. Pennington
by
J. A. Alexander ATTORNEY

UNITED STATES PATENT OFFICE.

CHARLES A. PENNINGTON, OF CHAMPAIGN, ILLINOIS, ASSIGNOR TO JAMES R. SCOTT AND JOHN L. RAY, OF SAME PLACE.

NUT-LOCK.

SPECIFICATION forming part of Letters Patent No. 314,194, dated March 17, 1885.

Application filed June 16, 1884. (No model.)

*To all whom it may concern:*

Be it known that I, C. A. PENNINGTON, of Champaign, in the county of Champaign and State of Illinois, have invented certain new and useful Improvements in Nut-Locks; and I do hereby declare that the following is a full, clear, and exact description thereof, reference being had to the accompanying drawings, and to the letters of reference marked thereon, which form part of this specification, in which—

Figure 1:
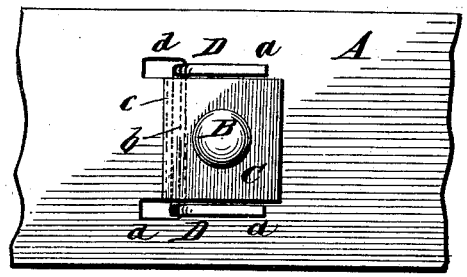
Figure 2:
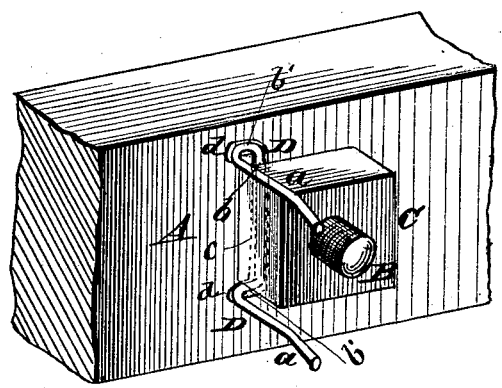
Figure 3:
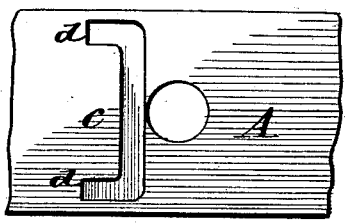
Figure 4:
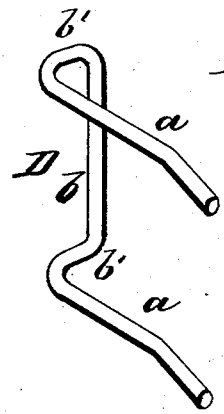
Figure 5:
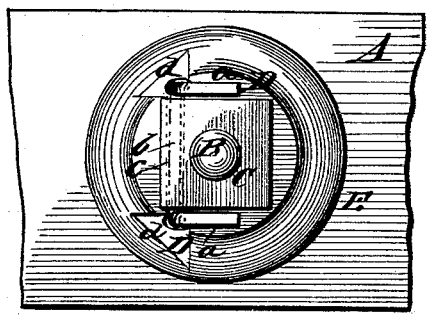

Figure 1 is a side view of a section of a beam, showing my improved locking device applied to a nut, no washer being used. Fig. 2 is a perspective view of the same parts, showing the locking device in a position for allowing the nut to be turned. Fig. 3 is a face view showing the shape of the groove in the beam to receive the locking device. Fig. 4 is a perspective view of the locking device detached. Fig 5 shows the locking device applied to a washer instead of directly to a beam.

This invention relates to devices for preventing nuts from jarring loose when screwed up tightly; and it consists in a locking device of peculiar construction, which can be used with or without a washer for securely holding a nut applied to a bolt, as will be fully understood from the following description, when taken in connection with the annexed drawings.

A designates a beam, bar, or other object to which my improved nut-lock is applied, B the bolt, and C a nut. The bolt and nut are of the well-known kind, as it does not require any change whatever in them to apply to the nut the improved locking device D. This device is made of wrought or cast metal; and it consists of two parallel arms, $a\ a$, which may be straight or curved, a cross-bar, $b$, which is at right angles to said arms, and which is out of the plane thereof, so as to form with them a kind of crank, as shown clearly in Fig. 4.

When I do not use a washer, E, as shown in Fig. 5, I make a groove or indentation, $c$, in the surface of the beam A, which is the length of the cross-bar $b$ of the locking device, and nearly as deep as the diameter of this bar, which groove terminates in short right-angular grooves adapted to receive the angles $d\ d$ of the locking device when the arms thereof are in a position to allow a nut to be turned on its bolt. (Shown in Fig. 2.)

When I use the washer E, the groove or indentation $c$ is made in the face of the same, instead of in the beam, and the washer is prevented from turning by forming serrations in that side which is in contact with the beam, and if the beam be metal similar serrations will be formed on it.

It will be observed by reference to Figs. 1 and 5 that the groove $c$ is within the superficial area of the nut, so that when the nut is screwed home it presses on the cross-bar of the locking device. When it is desired to turn the nut, the arms $a\ a$ of the locking device are turned perpendicular to the face of the beam or washer, and are thus without the range of the nut. When the nut is screwed up, the said arms $a\ a$ are turned down on opposite sides of it, as shown, thus securely holding it against turning. The locking-arms $a\ a$ are at right angles to the pivotal portion $b$, and have intermediate angular connections, $b'$, as clearly shown in Fig. 4.

I am aware that it is not new, broadly, to lock a nut by means of a wire bent to embrace the sides of a nut, nor to effect the same object by means of a key entering a groove in the nut; hence my invention is limited to the peculiar formation of the wire employed to form the lock.

Having described my invention, I claim—

1. The nut-lock herein described, consisting of a wire, D, bent toward its ends at right angles to the body $b$, and its ends again bent at right angles to the arms $b'$, and also to the body $b$, as shown and described.

2. In a nut-lock, the combination, with a nut and bolt, of the wire D, bent toward its ends at right angles to the body $b$, and its ends again bent at right angles to the arms $b'$, and also to the body $b$, as shown and described.

In testimony that I claim the foregoing as my own I affix my signature in presence of two witnesses.

CHARLES A. PENNINGTON.

Witnesses:
J. L. RAY,
JAS. C. MILLER.